United States Patent
Zaczek

(10) Patent No.: US 6,381,706 B1
(45) Date of Patent: Apr. 30, 2002

(54) FINE GRANULARITY REWRITE METHOD AND APPARATUS FOR DATA STORAGE DEVICE

(75) Inventor: Thomas E. Zaczek, Louisville, CO (US)

(73) Assignee: Ecrix Corporation, Boulder, CO (US)

(*) Notice: Subject to any disclaimer, the term of this patent is extended or adjusted under 35 U.S.C. 154(b) by 0 days.

(21) Appl. No.: 09/176,015

(22) Filed: Oct. 20, 1998

(51) Int. Cl.[7] .................................................. G06F 11/00
(52) U.S. Cl. ........................... 714/5; 360/53; 711/112
(58) Field of Search .......................... 714/5, 2, 25, 42, 714/701, 719, 819; 711/112; 360/48, 49, 53; 369/53.17, 257.3; 365/189.01, 189.05; 370/474, 912; 710/52

(56) References Cited

U.S. PATENT DOCUMENTS

| | | |
|---|---|---|
| 3,821,710 A | 6/1974 | Arciprete et al. |
| 3,962,727 A | 6/1976 | Kamimura et al. |
| 4,011,587 A | 3/1977 | Arter et al. |
| 4,099,211 A | 7/1978 | Hathaway |
| 4,106,065 A | 8/1978 | Ravizza |
| 4,125,881 A | 11/1978 | Eige et al. |
| 4,172,265 A | 10/1979 | Sakamoto et al. |
| 4,175,267 A | 11/1979 | Tachi |
| 4,215,377 A | 7/1980 | Norris |
| 4,257,075 A | 3/1981 | Wysocki et al. |
| 4,293,879 A | 10/1981 | Heitmann et al. |
| 4,357,639 A | 11/1982 | Hama et al. |
| 4,390,915 A | 6/1983 | Matsuyama |
| 4,394,694 A | 7/1983 | Ninomiya et al. |
| 4,404,605 A | 9/1983 | Sakamoto |
| 4,412,260 A | 10/1983 | Stricklin et al. |
| 4,420,778 A | 12/1983 | Sakamoto |
| 4,467,373 A | 8/1984 | Taylor et al. |
| 4,484,236 A | 11/1984 | Wilkinson |
| 4,486,796 A | 12/1984 | Sakamoto |
| 4,491,886 A | 1/1985 | Saito et al. |
| 4,492,991 A | 1/1985 | Osada et al. |
| 4,544,967 A | 10/1985 | Louth |
| 4,554,598 A | 11/1985 | Tarbox et al. |
| 4,581,662 A | 4/1986 | Sato |

(List continued on next page.)

FOREIGN PATENT DOCUMENTS

| | | |
|---|---|---|
| DE | 29 06 836 A1 | 9/1980 |
| EP | 0 793 228 A1 | 9/1997 |
| JP | 56-93157 | 7/1981 |
| JP | 58-133665 | 2/1982 |
| JP | 57-55579 | 4/1982 |
| JP | 59-139157 | 1/1983 |

OTHER PUBLICATIONS

Pizzi, New Audio Recording Formats, Broadcast Engineering, Feb. 1993, paragraph. 60–63.
NT–1, Apr. 1992.
Sasake, T., Asltad, J.,Younker, M., The NT Digital Mcro Tape Recorder, Goddard Conference on Mass Storage Systems and Technologies, Sep. 22–24, 1992, paragraph. 143–157.

*Primary Examiner*—Gopal C. Ray
(74) *Attorney, Agent, or Firm*—Jessica Clement; Daniel Fishman

(57) ABSTRACT

A method for rewriting track packets that fail a check-after-write test onto a track of a storage medium is presented. Local packet address information is included in the track packet itself to allow track packets to be written to the storage medium in any addressing order. This allows a single packet to be rewritten along a later track among other track packets that are being recorded for the first time, thereby reducing rewrite track overhead and eliminating the requirement for a lengthy backhitching sequence.

11 Claims, 8 Drawing Sheets

U.S. PATENT DOCUMENTS

| | | |
|---|---|---|
| 4,609,947 A | 9/1986 | Yamagiwa et al. |
| 4,614,991 A | 9/1986 | Murakami |
| 4,620,245 A | 10/1986 | Shimizu |
| 4,628,372 A | 12/1986 | Morisawa |
| 4,628,383 A | 12/1986 | Miyamoto |
| 4,636,873 A | 1/1987 | Eguchi |
| 4,637,023 A | 1/1987 | Lounsbury et al. |
| 4,641,210 A | 2/1987 | Ohyama |
| 4,642,714 A | 2/1987 | Miyamoto |
| 4,644,414 A | 2/1987 | Yamada et al. |
| 4,651,239 A | 3/1987 | Omori et al. |
| 4,654,731 A | 3/1987 | Froschl et al. |
| 4,663,673 A | 5/1987 | Doutsubo |
| 4,665,447 A | 5/1987 | Odaka |
| 4,677,504 A | 6/1987 | Yamazaki et al. |
| 4,680,654 A | 7/1987 | Shibuya |
| 4,682,247 A | 7/1987 | Doutsbo |
| 4,688,109 A | 8/1987 | Sangu |
| 4,703,373 A | 10/1987 | Oosaka |
| 4,714,971 A | 12/1987 | Sigiki et al. |
| 4,717,974 A | 1/1988 | Baumeister |
| 4,731,678 A | 3/1988 | Takeuchi |
| 4,737,865 A | 4/1988 | Murakami et al. |
| 4,739,420 A | 4/1988 | Odaka et al. |
| 4,757,911 A | 7/1988 | Nakano et al. |
| 4,758,904 A | 7/1988 | Takashashi et al. |
| 4,760,474 A | 7/1988 | Takimoto |
| 4,769,811 A | 9/1988 | Eckberg, Jr. et al. |
| 4,774,605 A | 9/1988 | Kato |
| 4,786,011 A | 11/1988 | Fujiwara et al. |
| 4,796,115 A | 1/1989 | Ohshima et al. |
| 4,799,221 A | 1/1989 | Fukami et al. |
| 4,802,172 A | 1/1989 | Fukami et al. |
| 4,812,924 A | 3/1989 | Fukami et al. |
| 4,821,129 A | 4/1989 | Culp |
| 4,835,628 A | 5/1989 | Hinz et al. |
| 4,843,495 A | 6/1989 | Georgis et al. |
| 4,845,577 A | 7/1989 | Georgis et al. |
| 4,897,739 A | 1/1990 | Hasegawa et al. |
| 4,918,546 A | 4/1990 | Saito |
| 4,930,027 A | 5/1990 | Steele et al. |
| 4,933,784 A | 6/1990 | Oldershaw et al. |
| 4,935,824 A | 6/1990 | Nakano et al. |
| 4,935,827 A | 6/1990 | Oldershaw et al. |
| 4,970,612 A | 11/1990 | Renders et al. |
| 4,977,469 A | 12/1990 | Yokozawa |
| 4,984,104 A | 1/1991 | Takahashi et al. |
| 5,003,411 A | 3/1991 | Nagahara et al. |
| 5,034,833 A | 7/1991 | Marlowe |
| 5,050,018 A | 9/1991 | Georgis et al. |
| 5,068,757 A | 11/1991 | Hughes et al. |
| 5,103,355 A | 4/1992 | Steele |
| 5,115,500 A | 5/1992 | Larsen |
| 5,142,422 A | 8/1992 | Zook et al. |
| 5,191,491 A | 3/1993 | Zweighaft |
| 5,251,077 A | 10/1993 | Saitoh |
| 5,262,905 A | 11/1993 | Takagi et al. |
| 5,327,035 A | 7/1994 | Thomas |
| 5,341,378 A | 8/1994 | Shih |
| 5,349,481 A | 9/1994 | Kauffman et al. |
| 5,414,570 A | 5/1995 | Fry et al. |
| 5,493,562 A * | 2/1996 | Lo |
| 5,535,068 A | 7/1996 | Hughes |
| 5,602,694 A | 2/1997 | Miles et al. |
| 5,623,470 A * | 4/1997 | Asthana et al. |
| 5,633,764 A | 5/1997 | Ohta |
| 5,781,688 A | 7/1998 | Seong |
| 5,872,997 A | 2/1999 | Golson |
| 5,953,177 A | 9/1999 | Hughes |

* cited by examiner

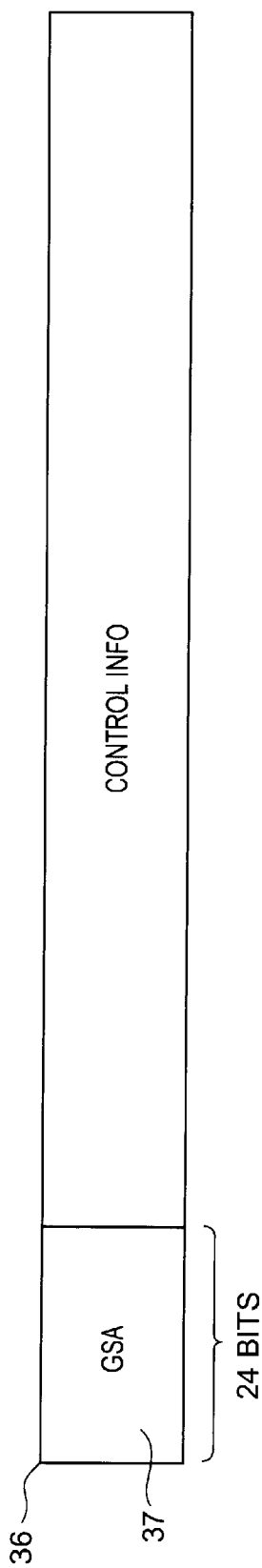

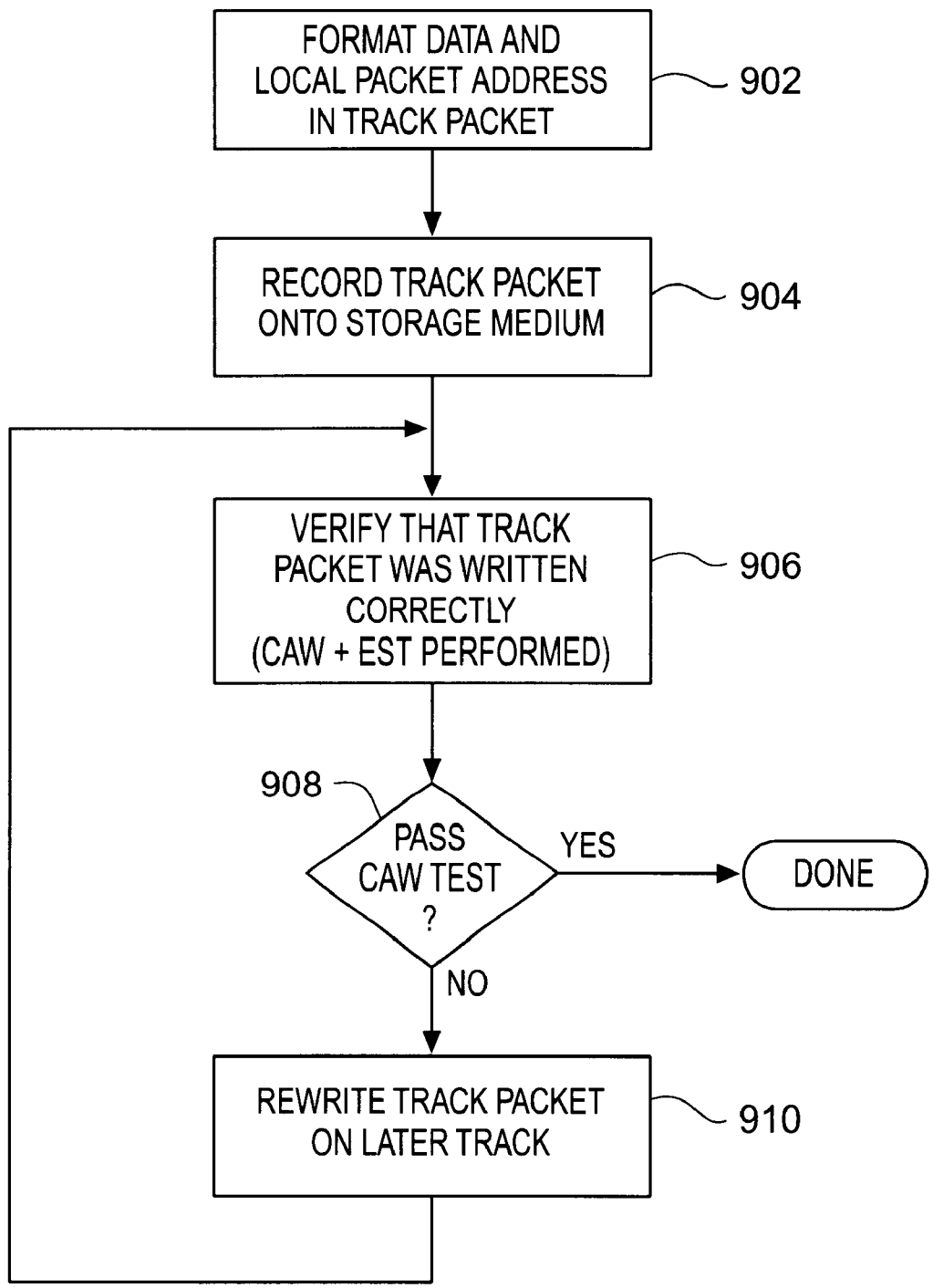

FINE GRANULARITY REWRITE METHOD AND APPARATUS FOR DATA STORAGE DEVICE

RELATED PATENTS

The present invention is related to co-pending U.S. patent application entitled "Variable Speed Recording Method and Apparatus for a Magnetic Tape Drive", invented by Beavers et al., and having a Ser. No. of 09/176,079, filed concurrently herewith on Oct. 20, 1998, and U.S. patent application entitled "Overscan Helical Scan Head for Non-Tracking Tape Subsystems Reading at up to 1× Speed and Methods for Simulation of Same", invented by Blatchley et al, and having a Ser. No. of 09/176,015, filed concurrently herewith on Oct. 20, 1998, and co-pending U.S. patent application entitled "Multi-level Error Detection and Correction Technique for Data Storage Recording Device", invented by McAuliffe et al., and having a Ser. No. of 09/176,014, filed concurrently herewith on Oct. 20, 1998, all of which are commonly owned and all of which are hereby incorporated by reference and co-pending U.S. patent application entitled "Method And Apparatus For Logically Rejecting Previously Recorded Track Residue From Magnetic Media", invented by McAuliffe et al., and having a Ser. No. of 09/192,794, filed on Nov. 16, 1998, and co-pending U.S. patent application entitled "Method And System For Monitoring And Adjusting Tape Position Using Control Data Packets", invented by McAuliffe et al., and having a Ser. No. of 09/193,030, filed on Nov. 16, 1998, and co-pending U.S. patent application entitled "Rogue Packet Detection And Correction Method For Data Storage Device", invented by McAuliffe et al., and having a Ser. No. of 09/192,809, filed on Nov. 16,1998, and co-pending U.S. patent application entitled "A Method Of Reacquiring Clock Synchronization On A Non-Tracking Helical Scan Tape Device", invented by Blatchley et al., and having a Ser. No. of 09/192,808, filed on Nov. 16, 1998.

FIELD OF THE INVENTION

The present invention pertains generally to data recording/recovery devices, and more particularly to a method for rewriting data that fails a check-after-write test to ensure data integrity.

BACKGROUND OF THE INVENTION

Data storage devices, which are used in both short- and long-term capacities, are an integral part of modern computer systems. While factors such as costs, device form factor, storage media size and capacity, and recording and recovery times are of high importance, of primary concern is the ability to maintain data integrity.

Accordingly, many tape drives include a check-after-write scheme whereby data is verified by a read head as the data is recorded onto the tape. For example, in a helical scan tape drive, in which data is written in tracks in an alternate-azimuth helical pattern by a pair alternate azimuth adjacent write heads mounted on a rotating drum, the newly recorded data is verified half a drum rotation later by a pair of alternate azimuth read heads located 180 degrees relative to the pair of write heads.

Whenever a check-after-write failure occurs, the write operation is suspended and the tape is repositioned backwards to allow enough space to accelerate again to the forward operating speed, and the track containing the "failed" data is overwritten by a new track on which the "failed" data is attempted to be rewritten. The failed data had to be rewritten before data which followed it in address sequence could be recorded onto the tape due to the format requirement calling for recording in-sequence.

The prior art backhitching sequence for rewriting "bad" data is problematic. First, the time required for a backhitching cycle increases data recording time and delays the host system by causing an interruption if data from the host had achieve a maximum throughput "streaming" mode. In addition, because backhitching induces extremely high transient forces that greatly increase tape wear and reduce the mechanical reliability of the drive, the backhitch operation can seriously impact data reliability.

The backhitching sequence can be avoided by simply rewriting tracks that contain "bad" data further down the tape without stopping the process. However, this methodology has the disadvantage that if the rewrite count is high, a significant portion of the tape is occupied by duplicate tracks containing mainly redundant "good" data, thereby reducing the storage capacity of the tape.

Accordingly, a need exists for a method for rewriting "bad" data without engaging in a backhitching sequence and without the overhead requirements of rewriting full mainly-redundant or mainly-empty tracks.

SUMMARY OF THE INVENTION

The present invention is a novel method and apparatus for performing rewrites at the packet level by allowing data to be recorded onto tracks on a magnetic media in any address sequence. Local packet address information is included in the track packet itself to allow track packets to be written to the storage medium in any addressing order. This allows a single packet to be rewritten along a later track among other track packets that are being recorded for the first time, thereby reducing rewrite track overhead and eliminating the requirement for a lengthy backhitching sequence.

BRIEF DESCRIPTION OF THE DRAWING

The invention will be better understood from a reading of the following detailed description taken in conjunction with the drawing in which like reference designators are used to designate like elements, and in which:

FIG. 2 is a diagram illustrating a control packet;

FIG. 3 is an illustrative embodiment of a local packet address (LPA) in accordance with the invention;

FIG. 4(*b*) is a diagram illustrating the relationship between the global segment address, local packet address, and physical segments on a storage medium;

FIG. 6(*b*) is a diagram of a data packet filled partially with user data and padded with fill data;

FIG. 9 is a flowchart illustrating one embodiment of a method for performing rewrites of bad packets in accordance with the invention.

DETAILED DESCRIPTION

A technique for rewriting data that fails a check-after-write test in a data recording/recovery device without requiring a backhitching sequence or the overhead of rewriting entire tracks is described in detail hereinafter. For purposes of illustration, the invention is described in the context of a magnetic tape drive; however, the method of the invention may be employed in any recording/recovery device that writes data in tracks onto the storage medium.

Figure 1:
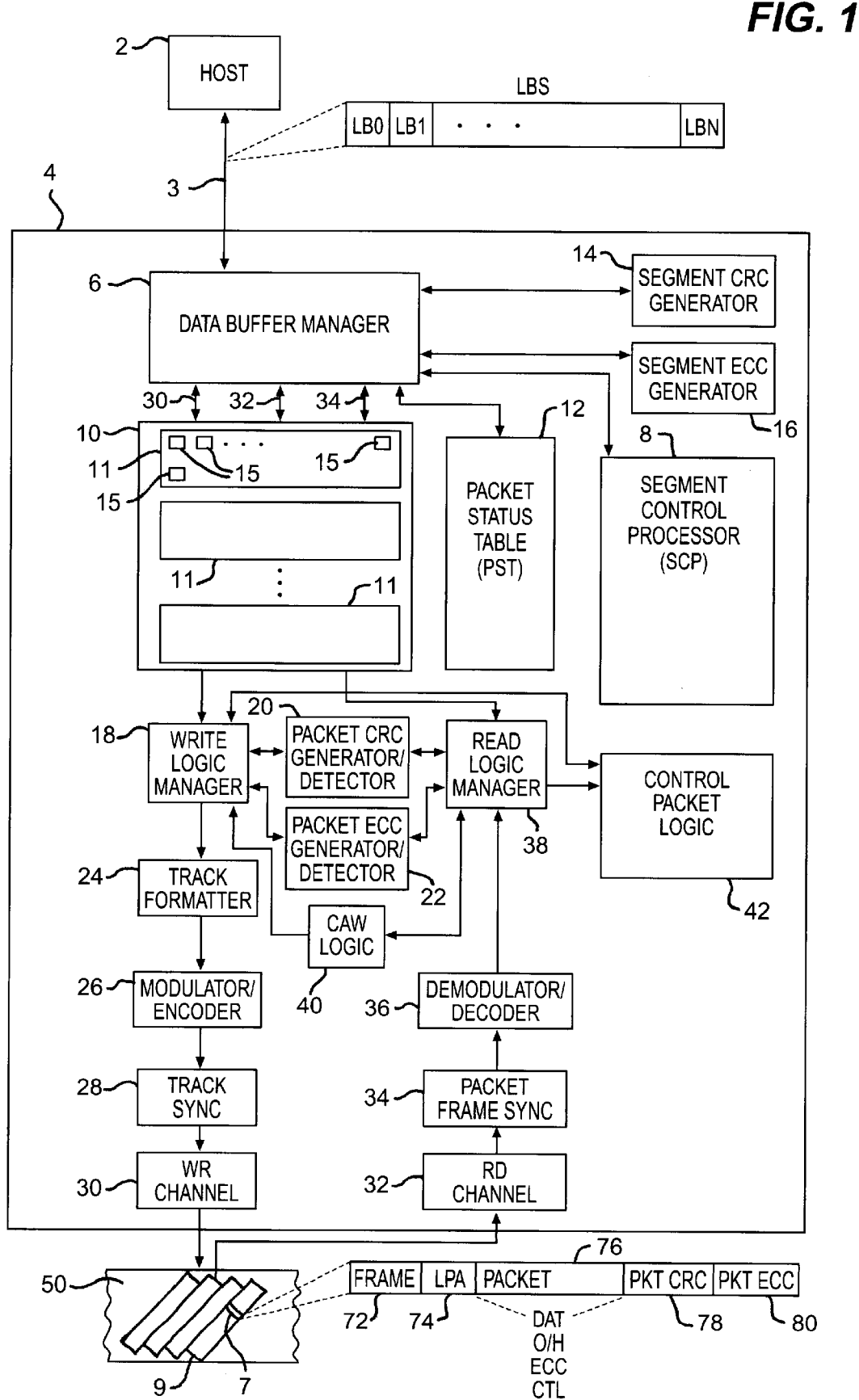
FIG. 1 is a system diagram of a data recording/recovery device in which the invention operates.

FIG. 1 is an illustrative embodiment of a data storage system in which the present invention operates. In the recording of data onto a storage medium 50, user data 3 is typically transferred to and from a recording/recovery device 4 by a host system 2 in variable length logical block sets 3. Each logical block set (LBS) 3 is a collection of user data bytes that contain a variable number of logical blocks (LB0, LB1, . . . , LBN). Each logical block (LB) is defined within its LBS by a unique logical block address (LBA).

LBS data 3 is partitioned into a number of fixed-sized data packets 30 by a data buffer manager 6 and placed within a buffer packet 15 in a data buffer 10 until being transferred to the storage medium 50. When the time comes to record a buffer packet 15 or control packet 36 onto the storage medium 50, write logic manager 18 causes packet CRC generator 20 to generate a packet cyclical redundancy code (CRC) over the packet and packet ECC generator 22 to generate a packet ECC over the packet and packet CRC. Write logic manager 18 formats the packet, packet CRC, and packet ECC, a logical packet address (LPA), and framing information into a track packet 7. The LPA comprises the address of the location of the packet in the segment 11. If the packet is a control packet 36, the LPA contains information pertaining to the type of control packet that it is. A track formatter 24 receives formatted track packets 7 from write logic manager 18, and formats them into tracks. A modulator/encoder 26 encodes and modulates the formatted track using, for example, a (1,6) Run Length Limited (RLL) channel modulation code into a 14-bit codeword. A track synchronization signal is added to each track by track synchronization signal generator 28, and the track is then sent to a write channel 30 to be recorded onto storage medium 50.

Track packets 7 are recorded onto a storage medium 50 in tracks 9. Multiple track packets 7 exist on each track 9. In the illustrative embodiment, each track packet 7 is a fixed size and includes framing information 72, a local packet address field 74, a packet field 76, a packet CRC field 78, and a packet ECC field 80.

During a recovery session, track packets 7 are detected by read channel 32. A packet frame synchronizer 34 uses the framing information 72 to detect the leading edge of a track packet 7. Framing information 72 is a unique signal that is sent between track packets 7 in the channel domain to provide synchronization for track packet detection. This signal does not obey the run-length restriction of the channel modulation code and does not have a byte symbol associated with it, meaning that it is not decoded to a byte symbol by demodulator/decoder 36. In the illustrative embodiment, the packet framing signal is 16 bit cells long and is a 4, 8, 4 pattern.

A demodulator/decoder 36 demodulates and decodes the packet 7. A read logic manager uses the local packet address field 74 to first determine whether the track packet 7 contains a control packet. The handling of control packets is performed by control packet processor 42 (discussed hereinafter). If the track packet 17 does not contain a control packet, it contains either a data packet 30, an overhead packet 32, or a segment ECC packet 34. Read logic manager 38 uses the local packet address 74 along with the current global segment address (discussed hereinafter with respect to control packets) to determine the correct location of the track packet in the buffer 10. Read logic manager 38, in conjunction with packet CRC generator/error detector 20, uses the packet CRC field 78 to detect whether track packet 7 contains any errors. If track packet 7 contains any errors, read logic manager 38, in conjunction with packet ECC generator/error corrector 22, uses the packet ECC field 80 to detect and correct track packet 7 errors. If the track packet 7 is good or has been corrected, read logic manager 38 extracts the contents of packet field 76 and send it to it proper location in the buffer 10.

Control packets 36 are generated during a recording session by a control packet processor 42, and contain information relating to the position of the media (such as beginning- or end-of-media), the beginning and or ending of files or data (e.g., filemarks, tapemarks, end-of-data marks), global address information (e.g., the global segment address of data surrounding the control packet), and system information (such as device control code). During a recording session, control packets 36 are processed by control packet processor 42 to determine the position of the storage media and where to place recovered data packets, buffer overhead packets, and segment ECC packets in the data buffer.

Certain control packets, illustrated in FIG. 2, are periodically placed along the tracks 9 of the storage medium 50 and contain a global segment address (GSA) 37. Control packet processor 42 extracts the global segment address 37 from these control packets 36 and maintains the current global segment address 37 in local storage. The GSA 37 is used in concert with a local packet address (LPA) contained in the LPA field 74 of each track packet 7 to define the location of a packet in a segment 11 of the buffer 10.

FIG. 3 is a diagram illustrating one embodiment of the definition of LPA field 74 in accordance with the invention. The LPA field 74 is a two-byte field that indicates whether the packet is a data/overhead/ECC packet 30, 32, 34 or a control packet 36. If the packet is a data/overhead/ECC packet, the LPA field 74 contains the buffer segment 11 address for the packet.

As illustrated, if the track packet 7 contains a data/overhead packet 30/32, the segment address is defined in bits 13:11, the row address is defined in bits 10:6, and the column address is defined in bits 5:1. Bit 0 indicates whether the packet is a rewritten packet. The locations of the row, column, diagonal and special ECC packets 34 are defined as illustrated. If the track packet 7 contains a control packet 36, bits 5:1 contain a type definition.

Figure 4A:
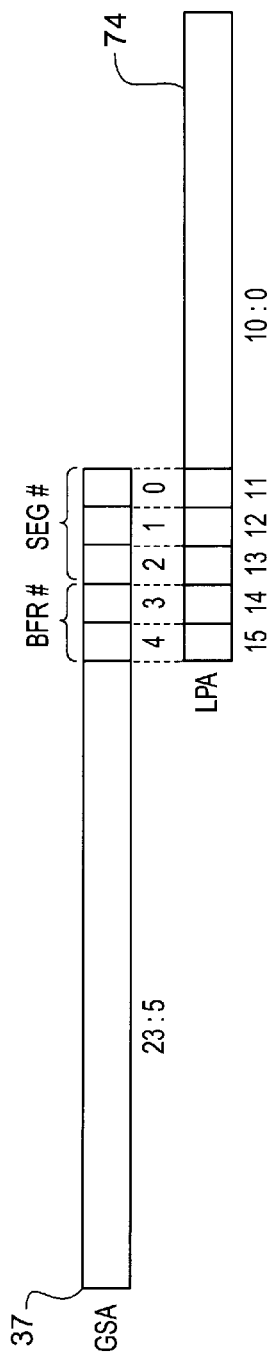
FIG. 4(*a*) is a diagram illustrating the relationship between a global segment address and a local packet address.

The lower 5 bits of the current GSA are shared by the upper 5 bits of the local packet address (LPA) field 74 of a track packet. The upper two bits 15:14 of the LPA allow for a four-segment aliasing, as illustrated in FIG. 4(a). In other words, the tape must physically move the equivalent of four memory buffers before LPAs begin to repeat.

Figure 4B:
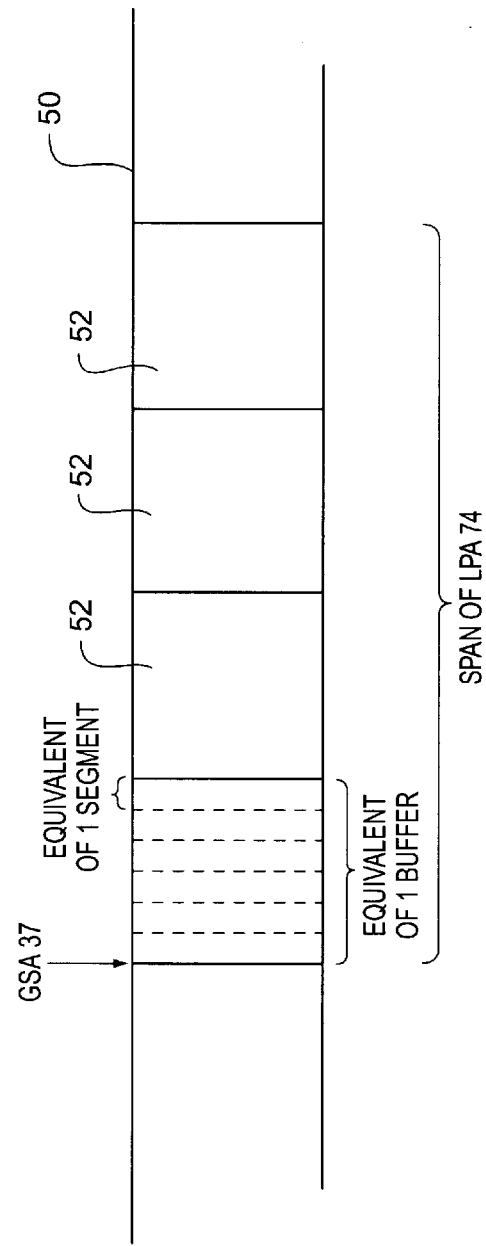

The global segment address (GSA) 37 addresses each segment 11 boundary in the data buffer 10 which corresponds to a physical segment 52 on tape 50, as shown in FIG. 4(b). In the preferred embodiment, as discussed hereinafter, the data buffer 10 comprises six buffer segments 11. The GSA 37 is a 24-bit number that spans an address range of $2^{24}$ segments 11, which covers the entire span of the storage media 50.

The LPA allows data/overhead/ECC packets 30, 32, 34 to be located unambiguously in the correct buffer segment 11 within four complete buffers 10 (of six segments 11 each).

In this embodiment, the two-byte LPA field 74 is combined with the 3-byte GSA 37 from an associated control packet 36 to uniquely identifies every data/overhead/ECC packet 30, 32, 34 location in a tape volume.

While packets spanning up to six buffer segments 11 may be present in one track 9, the local and global segment address contents are always associated with the most recent segment's data packets in that track. The write logic never allows local packet address 74 numbers spanning more than six segments 11 to exist on tape 50 within the same track 9.

The local packet address (LPA) 74 must be initialized at the start of a write session. Starting points for write sessions must initialize the LPA 74 to the starting address of a buffer segment 11. For initializing a tape partition, the hardware in the illustrative embodiment uses a value of zero for the initial value. Subsequent write sessions always involve a splicing operation that first read what the last LPA 74 used was. The new write data after the splice point then uses the next address that starts the next buffer segment 11.

It will be appreciated by those skilled in the art that this addressing scheme, namely the inclusion of a local packet address in each packet and the availability of an associated global segment address periodically written nearby its associated packets, provides a method for unambiguously indicating the correct location of a packet in a segment 11 of the data buffer 10.

Figure 5:
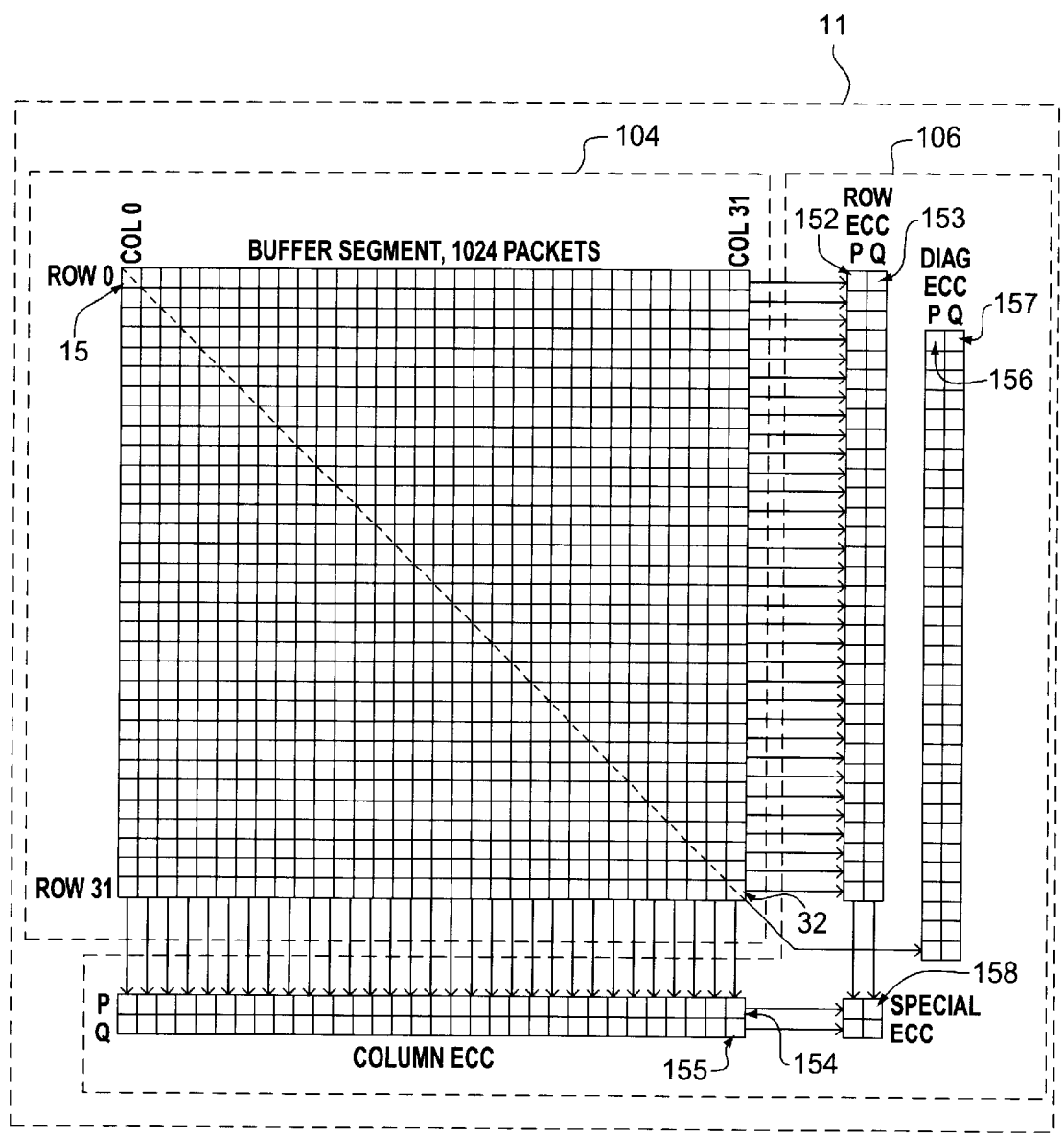
FIG. 5 is a diagram illustrating one embodiment of the contents and organization of a segment of a multi-segment data buffer implemented in accordance with the invention.

FIG. 5 illustrates one embodiment of the contents and organization of a segment 11 of a multi-segment data buffer 10 implemented in accordance with the invention. In this embodiment, segment 11 comprises a set of fixed-size buffer packets 15, each belonging to either a data/overhead area 104 or a segment ECC area 106. In the illustrative embodiment, the data/overhead area 104 comprises 114 packets 15 of 64 bytes each, and arranged in a 32-by-32 array. Packets 15 in the data/overhead area 104 contain either data packets 30 or overhead packets 32. Overhead packets 32 are used to locate the positions of where the LBS's 3 start and end in the segment 11. Typically only one packet 15, called the key overhead packet 32, is used for overhead in a segment 11 so that, in the illustrative embodiment, there are approximately 384 Kbytes (113*64*6=392,832 bytes) available in the buffer 10 for LBS data 3 in the best case.

Figure 6A:
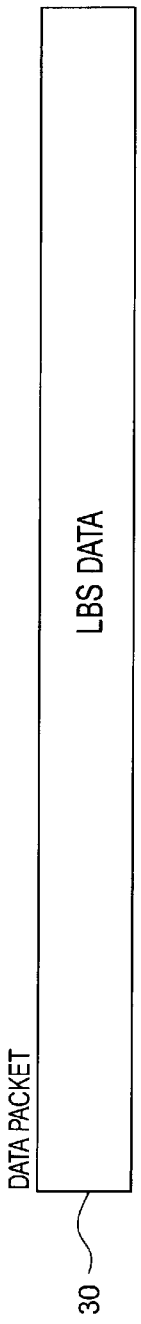
FIG. 6(*a*) is a diagram of a data packet completely filled with user data.
Figure 6B:
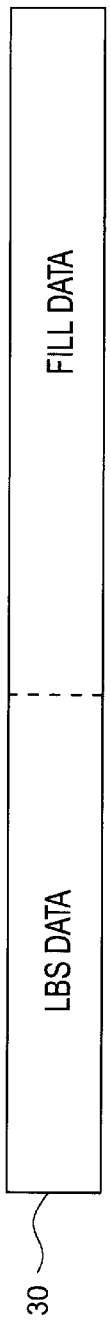

As just described, a packet 15 residing in the data/overhead area 104 of segment 11 contains either a data packet 30 or a overhead packet 32. Each data packet 30 is either completely filled with LBS data, as illustrated in FIG. 6(a) or contains LBS data followed by "fill" data, as illustrated in FIG. 6(b). Accordingly, in the illustrative embodiment, when the number of LBS data bytes are not exactly divisible by 64, the last data packet 30 of a given LBS 3 is padded out with don't-care "fill" data. Every LBS 3 begins at the beginning of a data packet 30 boundary, and each data packet 30 contains no more than one LBS.

Data/overhead area 104 of segment 11 also contains at least one overhead packet 32. Overhead packets 32 contain overhead information about the LBS's 3 that are stored in the segment 11. This information includes the location of all junctions between LBS's 3 residing in the segment 11, the logical block address (LBA) of the first LBS 3 to start in the segment 11, the size and number of logical blocks (LB's) within each LBS 3 that starts in the segment 11, the tape partition, volume initialization count, compression mode indicator, segment flush indicator, and the segment CRC.

Due to the allowance of variable LBS sizes, the number of overhead packets 32 in a given segment 11 is variable and depends on the number of LBS's that reside in the same segment. The variable overhead scheme optimizes the segment overhead space used. Each segment 11 contains at least one overhead packet 32, called the key overhead packet 32. In the illustrative embodiment, the key overhead packet 32 always occupies the last packet location of the segment (in the illustrative embodiment, row 31, column 31). If there are less than seven LBS junctions within the segment 11, the key overhead packet 32 is the only overhead packet 32 in the segment 11 and the LBS data can occupy up to the next to last packet location (row 31, column 30). For every up to eight additional LBS junctions that exist in the segment 11, an additional overhead packet 32 is present in the segment 11. The overhead packets 32 grow backwards in row 31 until the entire last row of the segment 11 is occupied with overhead packets 32. Accordingly, in the illustrative embodiment, the maximum number of LBS junctions that can exist in one segment 11 is 147.

Figure 7A:
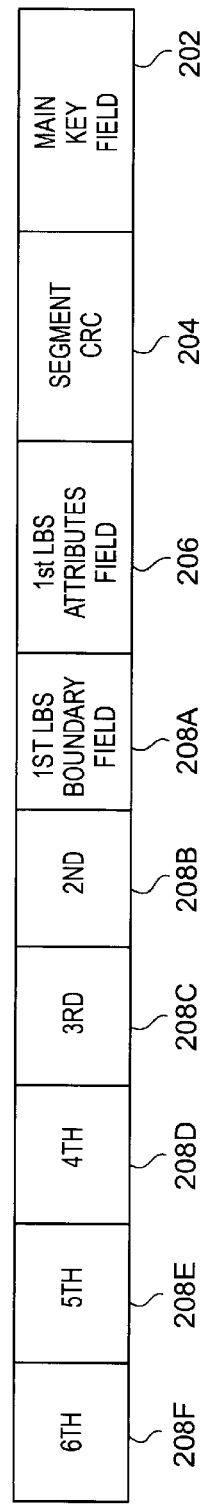
FIGS. 7(*a*)–7(*d* ) illustrate one embodiment of key overhead packet.

FIG. 7(a) illustrates one embodiment of key overhead packet 32. In this embodiment, key overhead packet 32 occupies 64 bytes, comprising nine separate fields. These fields include a main key field 202, the segment CRC field 204, a first LBS attributes field 206, and six LBS boundary fields 208a–208f. Each field 202, 204, 206, and 208a–208f include an 8-bit CRC associated with them for error detection across their field.

For any segment 11 containing LBS data, the segment CRC 204 and main key field 202 and first LBS attributes field 206 are always valid. The information in the main key field 202 determines which of the other overhead fields in the key overhead packet 32 are valid.

Figure 7B:
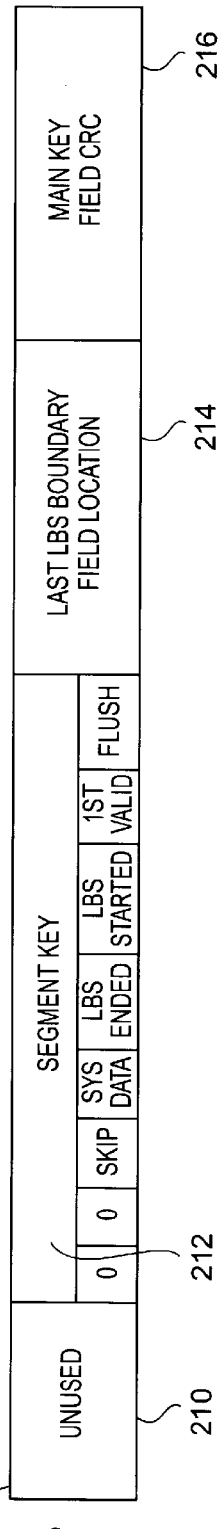

FIG. 7(b) illustrates one embodiment of the main key field 202 in key overhead packet 32. Main key field 202 occupies four bytes including one unused byte 210, a segment key 212, the location of the last LBS boundary 214, and the main key field CRC 216.

The segment key 212 include bits SKIP, SYS DATA, LBS ENDED, LBS STARTED and FLUSH, which are used for conveying key information about the LBS's that are stored in the segment 11. Normally, the last used overhead packet 32 is adjacent to the last data packet 30 in the segment 11, except for when the segment 11 is flushed or when a single unused packet 15 is skipped. SKIP bit is set to indicate the latter case. SYS DATA is set to indicate that the LBS data in this segment 11 is not user logical block data but rather system data. System data may include data created by the drive used to store control information such as locations of filemarks, directory structure, and logical format information as controlled by software. LBS ENDED bit is set only when at least one LBS 3 has an endpoint residing in this segment 11. LBS STARTED bit is set only when at least one LBS 3 has a starting point in this segment 11. FLUSH bit is set to indicate that the segment 11 has been flushed, as described hereinafter.

Referring back to FIG. 7(b), the main key field 202 also includes a last LBS boundary field location 214. This is an 8-bit value which locates the last LBS boundary field location within the overhead area of the segment 11. Five bits are used to indicate which column of row 31 the overhead packet 32 that contains this field is located. The remaining three bits are intra-packet (IPK) bits used to specify one of eight starting addresses within the 64-byte data packet where the last LBS boundary field begins.

The main key field 202 includes an 8-bit CRC field 216 which is used to store the CRC calculated across the main key field 202. In the illustrative embodiment, the CRC polynomial is: $X[8]+X[7]+X[2]+X[0]$.

Key overhead packet 200 in FIG. 7(a) also includes a segment CRC field 204. In the illustrative embodiment, segment CRC 204 is a 4-byte CRC used for storing the segment post-correction error detection, and is discussed hereinafter.

Figure 7C:
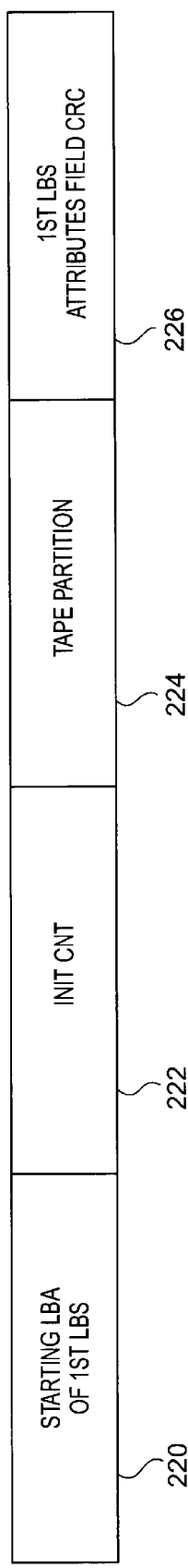

Key overhead packet 200 also includes a first LBS attributes field 206. One embodiment, illustrated in FIG. 7(c), includes a four-byte field 220 containing the logical block address (LBA) of the first LBS 3 to have a starting point in this segment 11, a two-byte field 222 containing the tape initialization count, a single-byte field 224 containing the tape partition number, and an 8-bit CRC field 226 used for error detection over the entire first LBS attributes field 206. The CRC polynomial in the illustrative embodiment is: $X[8]+X[7]+X[2]+X[0]$.

Figure 7D:
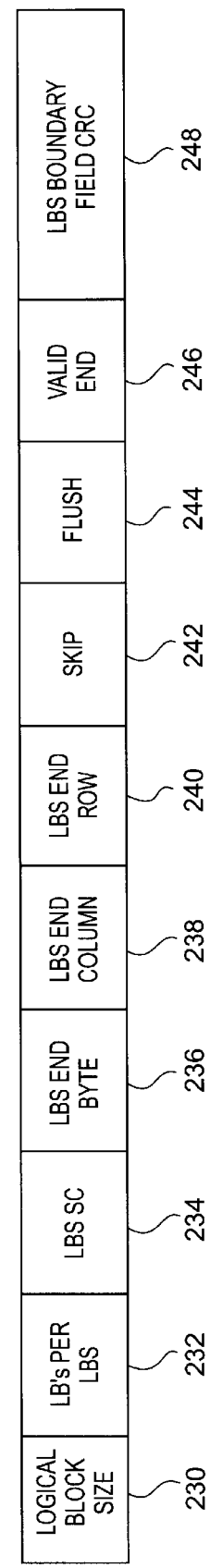

Key overhead packet 32 may also include one and up to six LBS boundary fields 208a–308f. FIG. 7(d) illustrates one embodiment of the format of an LBS boundary field 208, including a logical block size field 230, a number of logical blocks per LBS field 232, a logical block compression mode (LBSC) indicator 234, an LBS endpoint location 236, 238, 240, a skip indicator 242, a flush indicator 244, an endpoint valid indicator 246, and an LBS boundary field CRC 248. Logical block size field 230 occupies 18 bits in the illustrative embodiment and specifies the size of the logical blocks (LB) 104 stored within the logical block set (LBS) 3. The number of logical blocks per LBS field 232 occupies 13 bits and specifies how many LB's 104 are stored within the LBS 3. The logical block compression mode (LBSC) indicator 234 is set only when the LBS 3 has been compressed by compression hardware 116. The location of a valid LBS endpoint is determined using a 6-bit LBS endpoint byte field 236, a 5 -bit LBS endpoint column field 238, and a 5-bit LBS endpoint row field 240, in combination with endpoint validity indicator VALID END 246. Only if the VALID END indicator 246 is set is the endpoint location valid. An example of a valid LBS boundary field 208 having an invalid endpoint would be for an LBS 3 that started in this segment 11 but ended in the next segment. The skip indicator 242 is set only if there is a single unused packet 15 after the endpoint. LBS boundary field CRC 248 contains the CRC calculated over the entire 8-byte LBS boundary field 208, using the polynomial: $X[8]+X[7]+X[2]+X[0]$.

Not all LBS boundary fields 208a–308f are valid in a given overhead packet 32. The main key field 202 in the overhead packet 32 points to the last valid LBS boundary field 208 within the overhead packet 32. Also, if an LBS 3 starts in a segment 11 but does not end in the same segment 11, the last four bytes of the endpoint are not valid, but the first four bytes are valid. The FIRST VALID bit in the segment key field 212 in the main key field 202 of the key overhead packet 32 indicates that the first LBS that starts in the segment starts in the very first location of the segment (e.g., address 0).

Referring back to FIG. 5, segment 11 comprises a set of packets 15 organized into a segment ECC area 106. Segment ECC area 106 includes pairs P and Q of different redundancy code row ECC packets 152, 153, column ECC packets 154, 155, diagonal ECC packets 156, 157, and a set of "special" ECC packets 158. The row, column, diagonal and special ECC packets in the segment ECC area 106 are used to provide four-level error correction protection over the entire segment 11. During a recording session, the contents of the packets 152–158 in the segment ECC area 106 are generated, under the control of a segment correction processor (SCP) 8, from the data packets 30 and overhead packets 32 residing in the segment data area 104 and provide for correction of the data area packets 30 during a recovery session.

In the illustrative embodiment, each buffer segment 11 utilizes a 32-bit (4-byte) CRC for error detection and a multiple-layer Reed-Solomon scheme for error correction. As described previously, a 32-bit CRC used for segment post-correction error detection is stored in the segment CRC field 204 of the segment key overhead packet 32. All of the data packets 30 residing in the segment data/overhead area 104 of a segment 11 are divided by a CRC generator polynomial implemented in the CRC generator 14 to produce the 4-byte CRC. The last data packet 30 of the segment 11 (which may contain fill data if an LBS ends in it) is always used as a complete segment in this calculation. Overhead packets 32 and skipped packets 15 are not included in the CRC calculation. In the illustrative embodiment, the polynomial used to calculate the segment CRC 304 is:

$$X[32]+X[26]+X[23]+X[22]+X[16]+X[12]+X[11]+X[10]+X[8]+X[7]+X[5]+X[4]+X[2]+X[1]+X[0].$$

Multi-layer redundancy is provided by pairs P and Q of redundant codes generated over a plurality of patterns of packets 15 of a segment 11 of buffer 10. In the illustrative embodiment, the plurality of patterns include rows, columns, and diagonals. Other patterns may be used. In addition, error correction is performed over all of the first redundant codes P for both row and column ECC codes, and all of the second redundant codes Q for both row and column ECC codes to generate special ECC codes 158.

Segment ECC generator 16 includes a Reed-Solomon Syndrome generator and correction circuit that provides for a one- or two-packet correction in any row, column, or diagonal of the data/overhead area 104 of segment 11 by using erasure pointers. An erasure pointer is a pointer to a location of a missing packet that is treated as if it has been erased such that the data is all zeros. Erasure pointers are set by the SCP 8. Erasure pointers result from missing or uncorrectable data/overhead/segment ECC packets 30, 32, 34. Additionally, row ECC packets 152, 153 and column ECC packets 154, 155 can be corrected by a fourth level of correction provided in "special" ECC packets 158. Accordingly, four levels of error correction at the segment level occur.

Row redundancy is provided by row ECC packets P 152 and Q 153 for each row (0 through 31) of data/overhead area 104 of buffer segment 11. In the illustrative embodiment, the entire 32-packet-by-32-packet data/overhead area 104 of the buffer segment 11 is used to generate row ECC redundancy. Each of the 32 rows of packets 30 in the data/overhead area 104 is used to generate two unique redundant code row ECC packets P 152 and Q 153. Segment ECC generator 16 creates a byte in each of the two row ECC packets P 152 and Q 153 from the associated bytes of all the same-row packets 30. For example, byte address zero of each row ECC packet P 152 and Q 153 for row 5 is generated from all the byte address zero locations of the data packets 30 in row 5.

Similarly, column redundancy is provided by column ECC packets P 154 and Q 155 for each column (0 through 31) of data/overhead area 104 of buffer segment 11. In the illustrative embodiment, the entire 32-packet-by-32-packet data/overhead area 104 of the buffer segment 11 is used to generate column ECC redundancy. Each of the 32 columns of packets 30 in the data/overhead area 104 is used to generate two unique redundant codes in column ECC packets P 154 and Q 155.

Diagonal redundancy is provided by diagonal ECC packets P 156 and Q 156 for each diagonal (0 through 31) of data/overhead area 104 of buffer segment 11. The diagonals are defined to each include 32 packets. In one embodiment, a given diagonal N starts at column 0 and row N, and the next element of the diagonal is found by incrementing both the current column number and current row number, modulo 32. Table 1 illustrates the calculation of the diagonals for this embodiment.

TABLE 1

| DIAGONAL # | STARTING ROW | STARTING COLUMN | ENDING ROW | ENDING COLUMN |
|---|---|---|---|---|
| 0 | 0 | 0 | 31 | 31 |
| 1 | 1 | 0 | 0 | 31 |
| 2 | 2 | 0 | 1 | 31 |
| N | N | 0 | N-1 | 31 |

Four special ECC packets 158 are generated from the 64 column ECC packets. These four special ECC packets 158 are used to correct missing row ECC packets 152, 153 or column ECC packets 154, 155.

As data packets are recovered and placed into the data buffer 10, data buffer manager 6 updates a packet status table (PST) 12. Each segment 11 has a corresponding PST 12 which contains an entry corresponding to each buffer packet 15 in the segment 11. Each PST entry indicates: (1) whether the packet has been received and is good; (2) whether the packet was corrected by packet correction; (3) whether the packet was corrected by segment correction; and (4) whether the packet was corrected using either row, column, or diagonal ECC. In addition, each PST 12 contains a packet count containing the total number of good packets received for each instance of each pattern (i.e., each row, column, and diagonal). Each PST 12 also contains a total count which indicates the total number of good packets present in the segment 11. The counts are used by the SCP 8 to determine when correction can be applied to the segment. The SCP 8 manages all segment correction activities.

Figure 8:
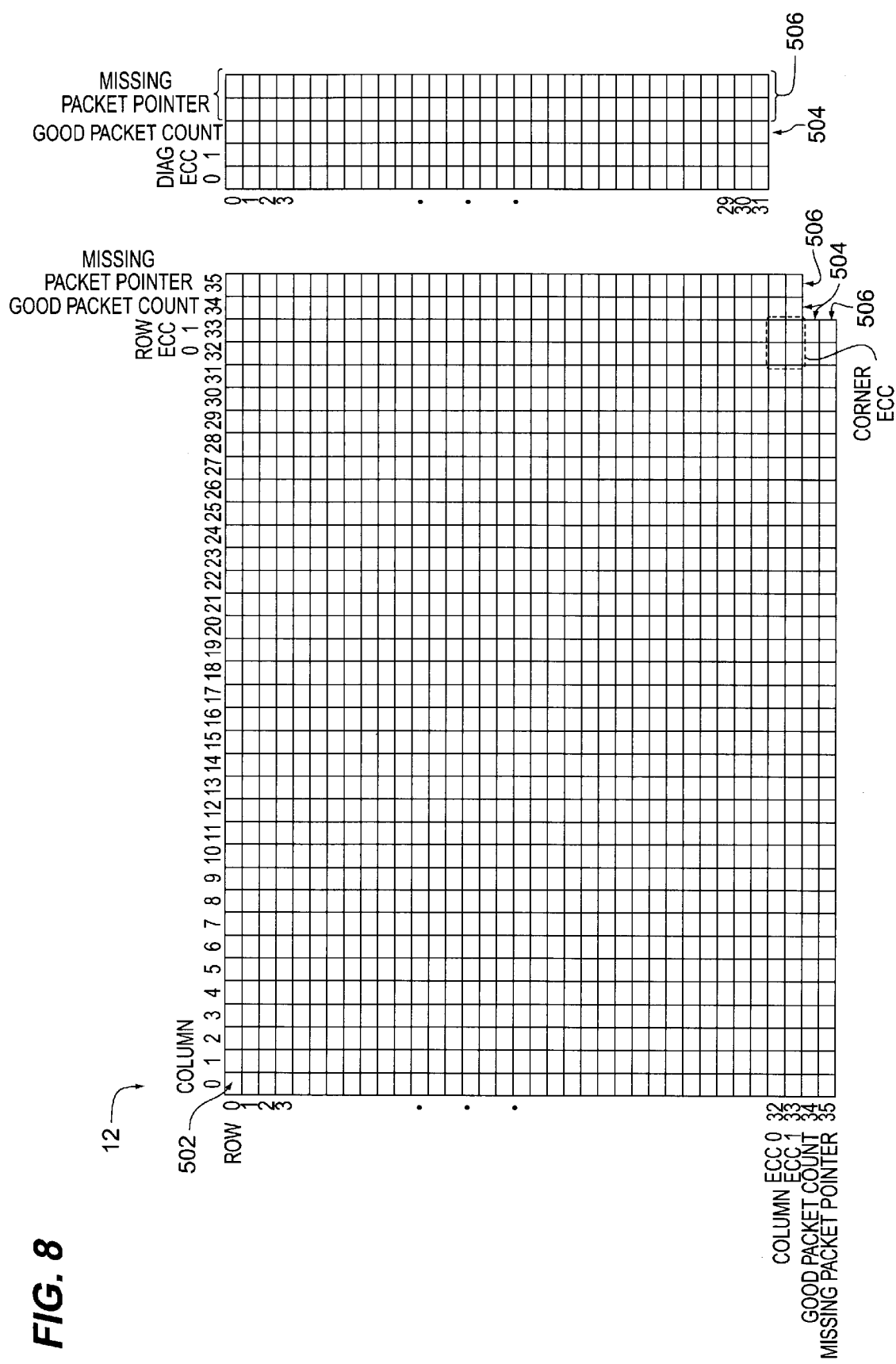
FIG. 8 is a diagram illustrating one embodiment of the contents and organization of a packet status table corresponding to the segment of FIG. 5.

FIG. 8 is a diagram of a PST 12 corresponding to the segment 11 of FIG. 5. Each cell 502 of PST 12 comprises a byte. Bits of each cell byte are used to indicate the presence of a good packet at that location, and the different possibilities of the way in which it was corrected. Row, column, and diagonal good packet counts 504 are maintained for each row, column, and diagonal. Missing packet pointers 506 for each row, column, and diagonal are maintained for each row, column, and diagonal.

During a recovery session, the segment correction processor (SCP) is turned on (by the detection of a new GSA) to reconstruct packets that are as-yet "missing" from the buffer as they become reconstructable. For example, as a segment 11 begins to fill, if a row, column, or diagonal becomes full less one or two "missing" packets, the ECC generator is able to reconstruct the missing packets. Because every packet lies in a row, column, and diagonal, the reconstruction of one or two missing packets along one of the three different patterns may fill out at least one of the other two patterns enough such that the missing packets located in that pattern can then be reconstructed. For example, if a row is missing only a single packet, error correction is performed on the entire row using the two unique redundancy code row ECC packets P 152 and Q 153 to reconstruct the missing packet. The reconstruction of the missing packet may fill out the diagonal that the reconstructed packet lies in enough that it is only missing a single other packet. Error correction is then performed on the reconstructed packet's diagonal to reconstruct the missing packet in the diagonal. This process continues until all of the packets in the segment are recovered or reconstructed.

Due to the addressing scheme (i.e., the combination of a global segment address and a packet-level local address) which unambiguously indicates the correct position of any given packet in the data buffer, track packets that fail the check-after-write test can be rewritten on a later track on a packet by packet basis. In other words, because the address order of packets written to the tape is no longer consequential to determining their position in the data buffer, a single track packet that fails the check-after-write test may be rewritten in a later packet along with other track packets that are being written for the first time. Accordingly, the later track, if it is filled entirely with new data and/or track packet rewrites, contains no redundant information. Also, because the read logic of the drive only allows "good" data to be sent to the data buffer, the detection of a "bad" data packet on the first encountered track will prevent it from being placed in the buffer. Then, upon detection of a "good" data packet associated with the same buffer address that is encountered on a later track will cause the good packet to be placed in the buffer. Accordingly, "bad" track packets are essentially ignored, and they are either reconstructed by the segment error correction processor or are recovered from a later track as a rewrite, whichever occurs first.

FIG. 9 is a flowchart illustrating one embodiment of the packet rewrite method of the invention.

As will be appreciated from the above detailed description of the invention, track rewrites occur on a much finer granularity than provided in prior art systems. Because of the unique addressing scheme, the correct location in the data buffer for each recovered track packet is determinable, and therefore track packets need not be recorded on the storage medium in any particular order. Accordingly, since the recording order of track packets is irrelevant, single track packets can be re-written along with other first-time recorded track packets, thereby reducing the amount of space required to rewrite a single packet error.

Although the invention has been described in terms of the illustrative embodiments, it will be appreciated by those skilled in the art that various changes and modifications may be made to the illustrative embodiments without departing from the spirit or scope of the invention. It is intended that the scope of the invention not be limited in any way to the illustrative embodiment shown and described but that the invention be limited only by the claims appended hereto.

What is claimed is:

1. A method for recording data onto a magnetic medium, comprising:

receiving a data packet into a location in a data buffer, said data packet having an associated local packet address (LPA) which uniquely identifies the location of said data packet in a segment of data present in said data buffer, said segment having an associated global segment address which uniquely identifies the sequential position of said segment of data to be recorded;

formatting said data packet and said associated local packet address into a track packet;

recording said track packet onto said magnetic medium;

recovering said recorded track packet from said storage medium;

periodically recording said global segment address onto said magnetic medium in proximity to one or more of said track packets which comprise a data packet associated with said global segment address;

recovering said recorded track packet from said storage medium;

recovering said recorded global segment address from said storage medium;

performing a check-after-write test on said recovered track packet; and re-recording, at the packet level, said track packet in any order along a later track if said track packet fails said check-after-write test.

2. A method for writing data onto a storage medium, comprising:

receiving a block of user data;

generating an error detection code over said block of user data;

formatting said block of user data and said associated error detection code into a data packet;

formatting said data packet into a track packet;

recording said track packet along with a plurality of other track packets along a track on a storage medium;

recovering said newly recorded track packet from said track on said storage medium;

determining whether said newly-recorded track packet matches said track packet; and re-recording said track packet on a later track if said newly-recorded track packet does not match said track packet.

3. A method in accordance with claim 2, comprising:

repeating said recovering step through said re-recording step until said track packet is successfully recorded onto said storage medium.

4. A method for recovering rewritten track packets from a storage medium, comprising:

recovering a track packet from a recorded track of said storage medium;

extracting a packet address field and a data packet from said track packet;

determining a location of said data packet in a data buffer using said packet address field;

determining whether said data packet contains an error; and placing said data packet in said data buffer at said determined location if said data packet does not contain an error; and repeating said recovering step through said placing step until a re-written track packet comprising an identical packet address field is placed in said data buffer.

5. A data recording/recovery device, comprising:

data input means for receiving a block of user data;

an error detection code generator which generates an error detection code over said block of user data;

a data packet formatter for formatting said block of user data and said associated error detection code into a data packet;

a track formatter which formats said data packet into a track packet;

a write channel for recording said track packet along with a plurality of other track packets along a track on a storage medium;

a read channel for recovering said newly recorded track packet from said track on said storage medium; and a check-after-write processor which determines whether said newly-recorded track packet passes a check-after-write test and causes said track packet to be re-recorded on a later track if said newly-recorded track packet does not match said track packet.

6. A data recording/recovery device in accordance with claim 5, comprising:

a track packet deformatter which extracts said data packet from said track packet; and an error correction processor which performs error correction on said extracted data packet if said extracted data packet contains an error.

7. A data recording/recovery device in accordance with claim 6, comprising:

a data packet deformatter which extracts said block of user data and said associated error detection code from said data packet;

an error detection code generator which uses said error detection code associated with said block of user data to detect an error in said block of user data; and data output means which outputs said block of user data if said block of user data does not contain an error.

8. A magnetic storage medium for a storing data recoverable by a data recording/recovery device, said data recording/recovery device comprising data input means for receiving a block of user data, an error detection code generator which generates an error detection code over said block of user data, a data packet formatter for formatting said block of user data and said associated error detection code into a data packet, a data buffer for temporarily storing said data packets, a track formatter which formats said data packet into a track packet, a write channel for recording said track packet along with a plurality of other track packets along a track on a storage medium, a read channel for recovering said newly recorded track packet from said track on said storage medium, a check-after-write processor which determines whether said newly-recorded track packet passes a check-after-write test and causes said track packet to be re-recorded on a later track if said newly-recorded track packet does not match said track packet, comprising:

a track, said track comprising a plurality of track packets, each track packet comprising a packet address which is used to determine a correct location of said track packet in said data buffer.

9. A method for recovering data from a magnetic medium, comprising:

recovering a track packet from said magnetic medium;

extracting a data packet and an associated local packet address from said track packet, said local packet address uniquely identifying a location of said data packet in a segment of data to be built in a data buffer;

recovering a global segment address associated with said data packet from said magnetic medium;

determining a location of said data packet in said data buffer using said local packet address and said global segment address;

determining whether said data packet contains an error; and placing said data packet in said data buffer at said determined location if said data packet does not contain an error.

10. A magnetic tape drive, comprising:

a read channel for recovering a recorded track packet and an associated global segment address from a magnetic medium;

a track packet deformatter which extracts a data packet and an associated local packet address (LPA) from said recovered track packet, said LPA and said associated gobal segment address uniquely identifying a location of said data packet in a segment of a data buffer; and a check-after-write processor which determines whether said newly-recorded track packet passes a check-after-write test and causes said track packet to be re-recorded at the packet level and in any order on a later track if said newly-recorded track packet fails said check-after-write test.

11. A magnetic storage medium, comprising:

a plurality of track packets, each track packet comprising a data packet and an associated local packet address (LPA) which uniquely identifies a sequential location for said data packet in a segment of data;

a global segment address associated with said plurality of track packets recorded in proximity to said plurality of track packets; and a rewritten track packet comprising a data packet previously recorded in one of said plurality of track packets and said LPA associated with said previously recorded data packet that is recorded, at the packet level and in any order, after each of said plurality of track packets belonging to said segment of data.

* * * * *